United States Patent
Shiomi et al.

(10) Patent No.: US 8,629,187 B2
(45) Date of Patent: Jan. 14, 2014

(54) CELLULOSE FINE PARTICLES, AND LIQUID OR SOLID DISPERSION THEREOF

(75) Inventors: Yoshiyuki Shiomi, Tokyo (JP); Nobuyuki Mimura, Tokyo (JP)

(73) Assignee: Asahi Kasei Fibers Corporation, Tokyo (JP)

( * ) Notice: Subject to any disclaimer, the term of this patent is extended or adjusted under 35 U.S.C. 154(b) by 612 days.

(21) Appl. No.: 12/522,667

(22) PCT Filed: Jan. 11, 2008

(86) PCT No.: PCT/JP2008/050280
§ 371 (c)(1),
(2), (4) Date: Jul. 9, 2009

(87) PCT Pub. No.: WO2008/084854
PCT Pub. Date: Jul. 17, 2008

(65) Prior Publication Data
US 2010/0087552 A1    Apr. 8, 2010

(30) Foreign Application Priority Data
Jan. 12, 2007  (JP) ................................ 2007-004606

(51) Int. Cl.
*C09K 3/00*      (2006.01)
*B01J 13/00*    (2006.01)

(52) U.S. Cl.
USPC ................. 516/106; 516/9; 516/98; 428/402

(58) Field of Classification Search
USPC ................. 516/9, 98, 106; 428/402
See application file for complete search history.

(56) References Cited

U.S. PATENT DOCUMENTS

| 3,415,808 | A | * | 12/1968 | Weber et al. ................. 534/796 |
| 4,902,792 | A |   | 2/1990  | Okuma et al. |
| 5,244,734 | A |   | 9/1993  | Okuma et al. |
| 5,366,750 | A | * | 11/1994 | Morano ....................... 426/572 |
| 6,225,461 | B1 |  | 5/2001  | Akimoto et al. |

FOREIGN PATENT DOCUMENTS

| EP | 1 577 361 | A1 |   | 9/2005 | |
| EP |  1577361  | A1 | * | 9/2005 | ............... C09K 3/30 |
| JP | 61-211342 |    |   | 9/1986 | |
| JP | 61-241337 |    |   | 10/1986 | |
| JP | 2-298516  |    |   | 12/1990 | |
| JP | 5-140332  |    |   | 6/1993 | |
| JP | 11-171901 |    |   | 6/1999 | |
| JP | 11-181147 |    |   | 7/1999 | |

OTHER PUBLICATIONS

Jianguo Zhang et al., "Facile synthesis of spherical cellulose nanoparticles," Carbohydrafe Polymers 69 (2007) 607-611.
Xiao-Fang Li et al., A Method of Preparing Spherical Nano-Crystal Cellulose with Mixed Crystalline Forms of Cellulose I and II, Chinese Journal of Polymer Science, vol. 19., No. 3 (2001), 291-296.
Supplementary European Search Report dated Feb. 10, 2011 issued in corresponding European Application No. 08703144.9-2115.

* cited by examiner

*Primary Examiner* — Ling Choi
*Assistant Examiner* — Chun-Cheng Wang
(74) *Attorney, Agent, or Firm* — Finnegan, Henderson, Farabow, Garrett & Dunner, L.L.P.

(57) ABSTRACT

An object of the present invention is to provide cellulose fine particles having a small particle diameter and a high average polymerization degree, and a liquid dispersion or a solid dispersion thereof.
The inventive cellulose fine particles have an average particle diameter of 9 to 400 nm and an average polymerization degree (DP) of cellulose of 150 to 3,000.

10 Claims, 4 Drawing Sheets

CELLULOSE FINE PARTICLES, AND LIQUID OR SOLID DISPERSION THEREOF

TECHNICAL FIELD

The present invention relates to cellulose fine particles, and a liquid or solid dispersion thereof.

BACKGROUND ART

Fine particles comprising a polymer are utilized in various fields by making use of their characteristic features. The characteristic features include: particle diameter, mechanical strength, particle size distribution, shape, aggregation degree and the like, and fine particles are used by optimizing these characteristic features according to usage.

As the particle diameter of fine particles become smaller, its specific surface area is increased and greatly affects the characteristic features of the fine particle. Above all, fine particles having a particle diameter of 1,000 nm or less supposedly exhibit characteristic features utterly different from those of a fine particle of more than 1,000 nm, and attempts to microparticulate fine particles of various materials are being made.

The mechanical strength of fine particles affect their durability and are governed by polymerization degree, molecular weight, structure and the like of the constituent polymer. The mechanical strength is preferably as high as possible or has an optimal value for some uses. However, fine particles having low mechanical strength are greatly limited in their utilization and therefore, fine particles are generally required to have a certain level of mechanical strength.

The particle size distribution of fine particles can be regarded as variation in the characteristic features of the fine particles, because the characteristic features of the fine particles are greatly affected by the particle diameter. Therefore, a fine particle with higher uniformity of the particle diameter is desired except for some cases.

Fine particles are prepared in various shapes according to usage and may take various shapes such as spherical, flat, porous and indefinite, and fine particles having a shape appropriate for the purpose are desired.

Also, aggregation of fine particles with each other brings about a great change in the particle diameter and shape. The aggregation includes reversibly redispersible light aggregation and irreversible strong aggregation. However, generally, fine particles causing less aggregation are desired.

Although the combination of these characteristic features and its specific uses are of endless variety, examples thereof include a slipperiness-imparting agent, a toner, a delustering agent for paints, an additive for light diffusion, an antiblocking material for packaging mediums, an insulating filler, a crystal nucleating agent, a filler for chromatography, an abrasive, and other various additives. Furthermore, uses such as carrier for immunodiagnostic reagents, spacer for liquid crystal displays, standard particle for calibration of analyzers, standard particle for tests of porous film, or the like are also increasing recently.

In particular, particles used as a carrier for immunodiagnostic reagents, a spacer for liquid crystal displays, a standard particle for calibration of analyzers, a standard particle for tests of porous film, or the like are required to have a small particle diameter, sufficiently high mechanical strength, uniform particle size, high sphericity, and less aggregation of particles with each other. Fine particles having such characteristic features are known as monodisperse fine particles and are produced by a method such as emulsion polymerization, dispersion polymerization, seed polymerization and suspension polymerization. As for the material, polystyrene particles are being widely used.

However, the polystyrene is hydrophobic to exhibit bad dispersion stability in water and has a problem such as a change in particle diameter due to aggregation, or precipitation. Accordingly, in the case of liquid dispersion in water, addition of a dispersion stabilizer such as a surfactant, or a surface treatment is necessary to enhance the hydrophilicity. Furthermore, polystyrene is a material having very high solubility in an organic solvent and having a very low melting point and therefore, is disadvantageous in that, for example, it dissolves or swells in various organic solvents or cannot be used in an environment where heat is generated.

More specifically, the following problems are pointed out.

(1) In the case of use as a carrier for immunodiagnostic reagents, nonspecific adsorption is caused due to the presence of a surfactant and there arises a measurement error.

(2) In the case of use as a carrier for immunodiagnostic reagents, the fine particle adhered to the measuring cell is not easily flowed by water washing due to hydrophobicity and there arises a measurement error resulting from white turbidity in the measuring cell.

(3) In the case of use as standard particles for tests of porous film, fine particles adhered to the porous film do not easily flow when washed by water, due to hydrophobicity and there arises a measurement error resulting from change in the particle blocking rate caused by adsorption instead of the intended filtration.

(4) In the case of use as a standard particle for tests of porous film, the kind of the organic solvent which can be used as the liquid for filtration is limited because the fine particles dissolve or swell in many organic solvents.

(5) In the case of use as a material added to a molding of another material, the dispersion medium is limited because the fine particles dissolve or swell in many organic solvents.

On the other hand, cellulose has various characteristic features not found in the synthetic polymer such as polystyrene. Specific examples of the characteristic features include: (1) chemically relatively stable and difficult to dissolve, (2) heat resistant and not dissolvable even at a high temperature, (3) an amphipathic polymer having both hydrophilicity and lipophilicity, (4) natural product-derived and regarded as harmless to humans, (5) shapability and formability, (6) cause less interaction with a substance such as protein and cause no adsorption, (7) have many hydroxyl groups and allow easy chemical modification, (8) easily burn and generate no harmful substances, and (9) a biodegradable polymer and regarded as environmentally friendly.

Cellulose fine particles are applied to various uses by making use of the characteristic features of (1) to (9) above. Although the specific uses are of an endless variety, examples thereof include applications in many fields, such as packing material for various fractionation columns, enzyme support, microorganism culture carrier, cell culture carrier, filter medium, adsorbent, medicament excipient, medicament disintegrant, medicament extender, particle enlargement substrate, food thickener, thixotropy-imparting agent, dispersion stabilizer, plastic extender, filler, cosmetic foundation base, exterior paint modifier, coating agent, molding agent for catalyst production by firing method, fiber wall material, and compounding ingredient for pressure-sensitive copying paper. Also, it is known that when formed into a liquid dispersion, cellulose fine particles uniquely act with the dispersion medium and exert a peculiar effect on the behavior of the liquid dispersion. Furthermore, a cellulose derivative obtained by the chemical reaction of a hydroxyl group of cellulose is also applied similarly to various uses.

Cellulose fine particles having various characteristic features have been heretofore used according to the usage described above, and cellulose fine particles include, for example, cellulose fine particles obtained through physical pulverization or chemical pulverization and cellulose fine particles obtained through dissolution, formation of cellulose droplets, and coagulation-regeneration.

Examples of the former cellulose fine particles include those described in Patent documents 1, 2 and 3. However, the methods disclosed in these patent publications describe pulverization of randomly breaking down a polymer having a large structural unit, and the obtained cellulose is in most cases a bar-like or fibrous particle having a large L/D (D: particle diameter, L: length of the particle), which cannot be said to be a fine particle. The shape thereof is of course not uniform. In some reports, a fine particle having a small particle diameter to a certain extent is obtained, but reduction in the average polymerization degree of cellulose is involved for making small the particle diameter. In other words, in these cellulose fine particles, the small particle diameter and the high average polymerization degree are in an inversely proportional relationship. Furthermore, in general hydrolysis, the microparticulation has a limit derived from the level-off polymerization degree of cellulose and it is very difficult to obtain cellulose fine particles having a particle diameter of 1,000 nm or less. In the method of Patent Document 3, spherical cellulose fine particles having a particle diameter of 20 to 100 nm can be successfully obtained by hydrolyzing regenerated cellulose. However, considering the hydrolysis conditions described in the Examples, the average polymerization degree of the obtained cellulose particles is apparently decreased to about 50 which is the level-off polymerization degree of regenerated cellulose.

Examples of the latter cellulose fine particles include those described in Patent Documents 4 and 5. In these patent publications, cellulose fine particles having high sphericity have been reported. This method does not require to decrease the average polymerization degree of cellulose, and cellulose fine particles having a higher average polymerization degree than that obtained through hydrolysis is expected. However, mechanical force such as stirring or shearing is employed for forming fine droplets from a cellulose solution prepared by dissolving cellulose, and it is very difficult to obtain cellulose fine particles having a particle diameter of 1,000 nm or less. Even if a fine droplet to a certain extent can be formed by using a shearing apparatus such as ultrahigh pressure homogenizer, since cellulose needs to be dissolved in a solvent, the cellulose concentration in the fine droplet has an upper limit, and the cellulose fine particles obtained therefrom have a low apparent density and suffer from problems with strength, shape and the like. Furthermore, the fine particles obtained by such a method have a possibility that, for example, the size of the particle diameter is non-uniform or a surfactant, inorganic salt component or the like added at the time of forming fine droplets may remain.

Regarding the method for solving these problems, a method using the microphase separation described in Patent Document 6 is known. In this method, a particulate cellulose thick phase is prepared by dissolving cellulose in a good solvent and bringing about a microphase separation, and cellulose fine particles are obtained by performing coagulation-regeneration. The microphase separation is a method generally employed as a production method of a porous film formed by connected particles, where primary particles produced by a phase separation grow together into a larger secondary particle and secondary particles are connected with each other to form a porous film. In Patent Document 6, this principle is applied to the production of fine particles, but the obtained fine particles are secondary particles or a mixture of a primary particle and a secondary particle. Accordingly, the particle diameter of the fine particles is not sufficiently small and the size of the particle diameter is also not uniform.

Patent Document 6 provides cellulose fine particles having a number average particle diameter of 20 to 1,000 nm, obtained by decreasing the viscosity at 20° C. of a cellulose solution after dissolving cellulose, to thereby reduce the size of the secondary particle. Incidentally, in the patent publication above, the average particle diameter is expressed by the number average particle diameter and in the following, a value converted into an approximate volume average particle diameter predictable from the particle size distribution in the patent publication is set forth. In the patent publication above, reduction in the concentration and polymerization degree of cellulose dissolved, particularly, reduction in the polymerization degree, is indispensable for reducing the particle diameter of the cellulose fine particles. In other words, also in the patent publication above, the small particle diameter of the cellulose fine particle and the high average polymerization degree are in an inversely proportional relationship. Generally, a cellulose structure is considered to loose sufficient high strength when the average polymerization degree becomes 150 or less. In cellulose fine particles having an average polymerization degree of 150 or more described in the patent publication above, judging from the Examples, the average particle diameter exceeds 450 mm. When the average particle diameter is 450 nm, the minimum particle diameter and the maximum particle diameter in the particle size distribution are 40 nm and 1,000 nm, respectively. In other to decrease the average particle diameter, the average polymerization degree of cellulose needs to be further reduced, and the above-described cellulose fine particle is not a cellulose fine particle satisfying both a sufficiently small particle diameter and a sufficiently high average polymerization degree. Also, uniformity of the particle diameter is very low.

In this way, cellulose fine particles having a small particle diameter and a high average polymerization degree have not yet been provided. Of course, cellulose fine particles having all of the characteristic features, such as uniform particle size, high sphericity and less aggregation of particles with each other, have not yet been provided either. Cellulose fine particles having all of these characteristic features are expected to bring out a new function in the usage where cellulose fine particles have been heretofore used. Furthermore, cellulose fine particles are expected to become fine particles having, as monodisperse fine particles, hydrophilicity, organic solvent resistance and heat resistance, each in a high level that polystyrene fine particles cannot reach.

Patent Document 1: Japanese Examined Patent Publication No. 40-26274

Patent Document 2: Japanese Unexamined Patent Publication No. 3-163135

Patent Document 3: Japanese Unexamined Patent Publication No. 11-1719.01

Patent Document 4: Japanese Unexamined Patent Publication No. 61-241337

Patent Document 5: Japanese Unexamined Patent Publication No. 11-181147

Patent Document 6: Japanese Unexamined Patent Publication No. 61-211342

DISCLOSURE OF THE INVENTION

Problems to be Solved by the Invention

Under these circumstances, an object of the present invention is to provide cellulose fine particles having a small particle diameter and a high average polymerization degree, and a liquid dispersion or a solid dispersion thereof. Another object of the present invention is to provide cellulose fine particles having, in addition to those characteristic features, all of the characteristic features such as high particle uniformity, high sphericity and less aggregation of particles with each other, and a liquid dispersion and a solid dispersion thereof.

Means for Solvent the Problems

The present inventors have succeeded in finding for the first time cellulose fine particles capable of solving the above-described problems. As for the cellulose fine particles obtained in the present invention, cellulose fine particles having an average particle diameter of about 1,000 nm can also be provided. However, considering the distribution thereof, when the average particle diameter is 400 nm or less, cellulose fine particles of which maximum average particle diameter does not exceed 1,000 nm can be obtained. It has been found that a liquid dispersion having dispersed therein such cellulose fine particles exhibit excellent dispersion stability even in the state where a surfactant is not added at all, and by virtue of its high polymerization degree, the mechanical strength of the cellulose fine particles is excellent as compared with conventional cellulose fine particles. The present invention has been accomplished based on these findings. That is, the present invention is as follows.

(1) Cellulose fine particles having an average particle diameter of 9 to 400 nm and an average polymerization degree (DP) of cellulose of 150 to 3,000.

(2) The cellulose fine particles according to (1) above, wherein the CV value represented by the following formula is from 10 to 70%:

CV Value=(standard deviation in the volumetric particle size distribution determined by a particle size distribution measuring apparatus)/(volumetric median diameter determined by the particle size distribution measuring apparatus).

(3) The cellulose fine particles according to (1) or (2) above, wherein the sphericity is from 0.70 to 1.00.

(4) The cellulose fine particles according to any one of (1) to (3) above, wherein the aggregation constant represented by the following formula is from 1.00 to 2.50:

Aggregation constant=(volume average median diameter determined by a particle size distribution measuring apparatus)/(volumetric median diameter determined from electron micrographic image).

(5) The cellulose fine particles according to any one of (1) to (4) above, which is colored with a dye or pigment.

(6) A cellulose fine particle liquid dispersion obtained by dispersing the cellulose fine particles according to any one of (1) to (5) above in a liquid.

(7) Powdery cellulose fine particles obtained by drying the cellulose fine particle liquid dispersion according to (6) above.

(8) A cellulose fine particle liquid dispersion obtained by resuspending the powdery cellulose fine particles according to (7) above in a liquid.

(9) A cellulose fine particle solid dispersion obtained by dispersing the cellulose fine particles according to any one of (1) to (5) above in a solid.

(10) A cellulose fine particle solid dispersion obtained by dispersing the powdery cellulose fine particles according to (7) above in a solid.

Effects of the Invention

The cellulose fine particles obtained in the present invention has high mechanical strength by virtue of the high polymerization degree, and a liquid dispersion thereof is favored with both of surprising characteristic features that the average particle diameter of the cellulose fine particles is small and because of the characteristic features of cellulose, the dispersion stability is high in various liquids without requiring the addition of a dispersion stabilizer. Accordingly, the fine particles can be of course used alone or dispersed in a liquid and furthermore, by using its liquid dispersion having high dispersion stability, a solid dispersion where the cellulose fine particles is uniformly dispersed in a solid without mixing an extra component such as dispersion stabilizer can be prepared.

BEST MODE FOR CARRYING OUT THE INVENTION

Figure 1:
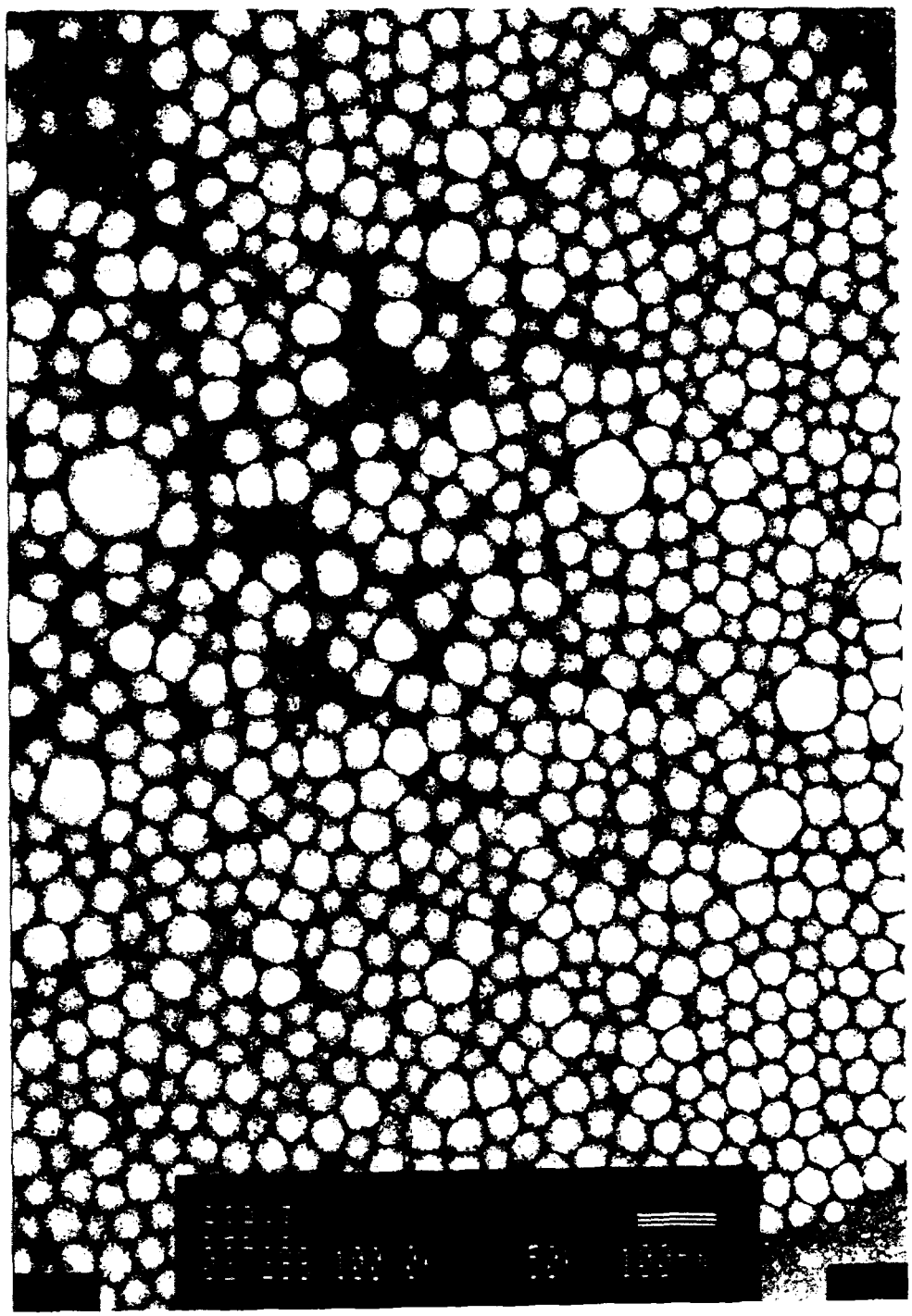
FIG. 1 is an electron micrograph of the cellulose fine particles obtained in Example 1, where the scale bar is 100 nm.

The present invention is specifically described below.

The characteristic features of the cellulose fine particles provided by the present invention are the following (1) to (5).

(1) The particle diameter of the cellulose fine particles is small.

(2) The average polymerization degree of cellulose is high.

(3) The particle diameter uniformity is high.

(4) The shape is spherical.

(5) Aggregation of particles with each other less occurs.

The cellulose fine particles of the present invention are fine particles composed of cellulose, and the evaluations of average particle diameter and CV value thereof are performed in the state of being dispersed in a liquid. On the other hand, the measurement of average polymerization degree and the observation by an electron microscope are, in view of evaluation characteristics, performed in the state of dried powdery cellulose fine particles.

In the present invention, the particle diameter of the cellulose fine particles indicates a value obtained by dispersing the cellulose fine particles in a liquid and measuring the resulting cellulose fine particle liquid dispersion by means of a particle size distribution measuring apparatus. Furthermore, the average particle diameter indicates a measured value of the volume average median diameter. The particle size distribution measuring apparatus includes those based on various measuring principles, but in the present invention, a particle size distribution measuring apparatus by a dynamic light-scattering method is used. As described later, a "Nanotrac particle size distribution measuring apparatus UPA-EX150" manufactured by Nikkiso Co., Ltd. is used in Examples.

The medium in which the cellulose fine particles are dispersed at the measurement is not particularly limited as long as it does not dissolve, swell or aggregate the cellulose, but the hydrophilic liquid described below is preferred. Examples thereof include, for example, water, an aqueous ammonia solution, alcohols such as methanol, ethanol and isopropyl alcohol, ketones such as acetone, and tetrahydrofuran.

The average particle diameter of the cellulose fine particles of the present invention is from 9 to 400 µm. Fine particles having an average particle diameter exceeding 400 nm may be obtained, but considering the particle diameter distribution of the cellulose fine particles obtained in the present invention, when the average particle diameter is in the range above, the maximum particle diameter becomes 1,000 nm or less and in use as a cellulose fine particle liquid dispersion, the dispersion stability is more enhanced. In view of uniformity and less aggregation, the average particle diameter is preferably from 9 to 300 nm, more preferably from 9 to 200 nm, still more preferably from 9 to 100 nm.

In the present invention, as for the average polymerization degree (DP) of cellulose, the specific viscosity of a dilute cellulose solution prepared by dissolving the cellulose fine particles in cadoxen is measured by a Ubbelohde type viscometer, and a value calculated from the intrinsic viscosity number [η] thereof according to the following viscosity formula (1) and conversion formula (2) is employed (see, *Eur. Polym. J.*, 1, 1 (1996)).

$$[\eta] = 3.85 \times 10^{-2} \times M_W^{0.76} \quad (1)$$

$$DP = M_W/162 \quad (2)$$

The average polymerization degree of the cellulose fine particles of the present invention is from 150 to 3,000. Cellulose fine particles having an average polymerization degree of 150 or less may be obtained, but from the standpoint of mechanical strength of the cellulose fine particles, the average polymerization degree is preferably 150 or more. When cellulose having a high average polymerization degree is used as the raw material, the average polymerization degree of the obtained cellulose fine particles can be made high. However, in view of easy dissolution or availability of the cellulose raw material, the average polymerization degree is preferably 3,000 or less. Considering the mechanical strength and easy dissolution of the obtained cellulose fine particles, the average polymerization degree is preferably from 200 to 2,000, more preferably from 300 to 1,500, still more preferably from 400 to 1,000.

The CV value as used in the present invention is an abbreviation of Coefficient of Variation and is generally used as an indicator of uniformity of fine particles. This is the dispersity in the particle size distribution of the cellulose fine particle liquid dispersion, expressed on the volume basis, and is defined by the following formula (3). As this value is smaller, the particle size distribution is sharper and the size of the cellulose fine particle is more uniform. The value is expressed in unit of (%).

$$CV\ \text{Value} = (\text{standard deviation in the volume particle size distribution determined by a particle size distribution measuring apparatus})/(\text{volume average median diameter determined by the particle size distribution measuring apparatus}) \times 100 \quad (3)$$

The CV value of the cellulose fine particles of the present invention can be arbitrarily set according to usage but is preferably from 10 to 70% for not allowing the maximum particle diameter to exceed 1,000 nm. In view of high uniformity, the value is more preferably from 10 to 50%, and particularly in use as a monodisperse fine particles, the value is still more preferably from 10 to 30%, yet still more preferably from 10 to 20%. In the case of intending to reduce the CV value, the value may be adjusted to this effect by selecting the production conditions but can also be adjusted through classification of particles by an operation such as filtration or centrifugal separation. Furthermore, in order to increase the CV value, the value may be adjusted to this effect by selecting the production conditions, but can also be adjusted by mixing two or more kinds of cellulose fine particles having different particle diameters.

The sphericity as used in the present invention is a value representing the shape of the fine particle and when the projected area of a fine particle appearing in an electron micrographic image is measured, the sphericity is defined as the ratio between the circumferential length of a circle having the same area as the projected area and the actual circumferential length of the fine particle appearing in the electron micrographic image. In this measuring method, each particle is merely observed only at a plane, but the variation in the observation direction can be taken into consideration by using an average value of at least 100 or more fine particles measured, as a result, the degree of true sphere when the fine particle is stereoscopically viewed can be indicated. As this value is closer to 1.00, the particle shape is more spherical. When the particle is a perfectly true sphere, the value is 1.00.

The sphericity of the cellulose fine particle of the present invention is preferably from 0.70 to 1.00. Particularly, in use as monodisperse fine particles, the sphericity is more preferably from 0.80 to 1.00, still more preferably from 0.90 to 1.00. When the sphericity is in this range, the shape of the fine particle can be regarded as spherical.

The aggregation constant as used in the present invention indicates the degree of aggregation of cellulose fine particles and is defined by the following formula (4):

$$\text{Aggregation constant} = (\text{volume average median diameter determined by a particle size distribution measuring apparatus})/(\text{volumetric median diameter determined from electron micrographic image}) \quad (4)$$

Here, as for the volumetric median diameter determined from an electron micrographic image, at least 100 or more fine particles are measured. Also, even in the case where fine particles are contacted with each other on the electron micrographic image and appear as if aggregated, the median diameter of each fine particle is measured. In other words, the average particle diameter determined from the electron micrographic image indicates an average particle diameter when the fine particles are not completely aggregated with each other, whereas the average particle diameter determined by a particle size distribution measuring apparatus indicates an average particle diameter in terms of the size of fine particles actually aggregated in the liquid dispersion. In the case where these two average particle diameters are equal, the aggregation constant becomes 1.00 and this reveals that fine particles in the liquid dispersion are not aggregated with each other. If aggregation of fine particles in the liquid dispersion occurs, the average particle diameter determined by the particle size distribution measuring apparatus and in turn, the aggregation constant become large. By defining the aggregation constant in this way, the aggregation of fine particles in the liquid dispersion can be compared.

The aggregation constant of the cellulose fine particles of the present invention can be arbitrarily set according to usage but is preferably from 1.00 to 2.50 for not allowing the maximum particle diameter to exceed 1,000 nm. Particularly, from the standpoint that the fine particles can be used as a monodisperse fine particles, the aggregation constant is more preferably from 1.00 to 1.10. If desired, the aggregation constant may be made to exceed 2.50 and can be adjusted to this effect, for example, by selecting the production conditions, using an aggregating agent, adjusting the pH, or crosslinking the chemical structures.

In the cellulose fine particle liquid dispersion of the present invention, the liquid for dispersing the cellulose fine particles therein is not particularly limited in its kind as long as it does not dissolve the cellulose, and examples thereof include various liquids such as water, aqueous inorganic compound solution, hydrocarbons, alcohols, ethers, acetals, aldehydes, ketones, amines, esters, fatty acids, phenols, nitrogen compound, sulfur compound, phosphorus compound, halogen compound and ionic liquid. However, considering that the cellulose is a hydrophilic material, in view of stability of the liquid dispersion, the solvent is preferably a hydrophilic solvent or a solvent having a hydrophilic substituent. For example, preferred examples thereof include water such as pure water and deionized water, an aqueous inorganic compound solution, alcohols, ethers, aldehydes, ketones, fatty acids, amines, and other hydrophilic organic solvents or solvents having a hydrophilic substituent.

More preferred examples include water, an aqueous ammonia solution, methanol, ethanol, n-propanol, isopropanol, n-butanol, isobutanol, sec-butyl alcohol, tert-butyl alcohol, 2-ethylbutanol, n-hexanol, n-heptanol, n-octanol, n-dodecanol, ethylhexanol, cyclohexanol, methyl isobutyl carbinol, amyl alcohol, benzyl alcohol, furfuryl alcohol, ethylene oxide, 1,4-dioxane, tetrahydrofuran, acetaldehyde, benzaldehyde, butylaldehyde, acetone, methyl ethyl ketone, dimethylsulfoxide, cyclopentanone, cyclobutanedione, cyclohexanone, acetophenone, methyl formate, methyl acetate, ethyl lactate, methyl benzoate, dimethyl phthalate, diethyl phthalate, diethyl oxalate, dimethyl salicylate, dimethyl malonate, tolylene diisocyanate, methylene glycolate, butyrolactone, caprolactone, propionlactone, ethylene glycol, ethylene glycol diacetate, ethylene glycol monomethyl ether, ethylene glycol monoethyl ether, ethylene glycol monobenzyl ether, ethylene glycol monophenyl ether, diethylene glycol, diethylene glycol monoethyl ether, diethylene glycol monoethyl ether acetate, triethylene glycol, tetraethylene glycol, propylene glycol, propylene glycol methyl ether, dipropylene glycol, neophenyl glycol, 1,3-butanediol, 1,4-butanediol, 2,3-butanediol, 1,5-pentanediol, 2,4-pentanediol, 2,5-hexanediol, methyl-2-pentanediol-1,3, dimethyl-2,2-butanediol-1,2, dimethyl-2,2-butanediol-1,3, dimethyl-2,2-propanediol-1,2, ethylene chlorohydrin, ethylene cyanohydrin, glycerin, formic acid, acetic acid, acetic anhydride, n-butyric acid, isobutyric acid, n-valeric acid, propionic acid, propionic anhydride, succinic anhydride, maleic anhydride, dichloroacetic acid, acrylic acid, methacrylic acid, m-cresol, ethylenediamine, dimethylformamide, aniline, acetonitrile, quinoline, morpholine, pyridine, and ε-caprolactam.

A solvent prepared by mixing these compounds at an arbitrary ratio may also be used, or a mixture with a hydrophobic solvent having compatibility with such a solvent may also be used. Furthermore, if desired, a surfactant may be added. Also, a water-soluble ionic substance and other solid matters or a solid material which is dissolved by the dispersion medium may be added.

The solvent is evaporated from the cellulose fine particle liquid dispersion having dissolved therein a solid matter or a solid material to form a solid molding, whereby a cellulose fine particle solid dispersion comprising the cellulose fine particles of the present invention uniformly dispersed in a solid molding can be obtained.

In the cellulose fine particle solid dispersion of the present invention, the solid in which the cellulose fine particles are dispersed may be a polymer, glass, a ceramic, a metal or the like and is not limited in its kind. The above-described cellulose fine particle-containing liquid dispersion is added in the stage of a liquid such as melted, dissolved or raw material state before forming a solid molding and thereafter, a solid molding is formed by an operation known in this art, whereby a cellulose fine particle solid dispersion comprising the cellulose fine particles of the present invention uniformly dispersed in a solid molding can be obtained.

The dispersion stability of the cellulose fine particle liquid dispersion of the present invention indicates the degree of precipitation or aggregation during standing still. In the present invention, the cellulose fine particle liquid dispersion is left standing for 1 month, and the dispersion stability is evaluated by the presence or absence of precipitation in an appearance inspection before and after standing still and the change in the measured value of the average particle diameter. A liquid dispersion where precipitation of the fine particles are scarcely observed and the change rate of the average particle diameter (average particle diameter after standing still/average particle diameter before standing still) is close to 1.0, can be said to be an excellent liquid dispersion with less precipitation or aggregation. However, the change rate, may take a value of 1.0 or less in some cases due to the measurement error of the particle size distribution measuring apparatus.

In the present invention, the cellulose fine particles may be also obtained in the powder state by drying the liquid dispersion resulting from dispersion of the cellulose fine particles in a liquid. At this time, the drying method is not particularly limited and various drying methods in general, such as natural drying, drying by heating, drying under reduced pressure, freeze-drying under reduced pressure, and critical point drying, may be used. At the time of drying the liquid dispersion, the liquid in which the cellulose fine particles are dispersed is also not particularly limited, and a liquid described above can be used. The thus-obtained powdery cellulose fine particles may be used as it is or may be resuspended in a liquid and used as a resuspended cellulose fine particle liquid dispersion.

In the present invention, the resuspended cellulose fine particle liquid dispersion is a liquid dispersion containing cellulose fine particles dried once or more times. The surface or pore shape, the crystallinity, the swelling degree and the like of cellulose can be adjusted by selecting the drying conditions, and by making use of this, the characteristics of the cellulose fine particles can be varied. In other words, as compared with a cellulose fine particle liquid dispersion containing never-dried cellulose fine particles, the resuspended cellulose fine particle liquid dispersion containing once-dried cellulose fine particles can be changed in the characteristic features as a liquid dispersion. The same applies to the cellulose fine particle solid dispersion.

As for the powdery cellulose fine particles of the present invention, although depending on the drying conditions, powdery cellulose fine particles with less change in the average particle diameter between before and after drying can be obtained when compared with the average particle diameter of the resuspended cellulose fine particle liquid dispersion after resuspension in a liquid and the average particle diameter of the cellulose fine particle liquid dispersion before drying. In general, it is said that fine particles are readily aggregated due to drying as the particle diameter of the fine particle becomes smaller, and once-aggregated fine particles can be hardly again separated. In this regard, the powdery cellulose fine particles of the present invention are cellulose fine particles with excellent resuspendability and less change in the particle diameter between before and after drying. However, at the resuspension, light aggregation of cellulose fine particles may occur and therefore, a dispersing treatment by a shear treatment or an ultrasonic treatment may be performed. By virtue of utilizing the property above, a cellulose fine particle liquid dispersion where the cellulose fine particles are dispersed in an arbitrary medium can be easily and simply prepared without requiring a cumbersome work when changing the dispersion medium of the cellulose fine particle liquid dispersion, such as repeating the operations of centrifugal separation, decantation and dilution with the objective dispersion medium in this order.

The cellulose fine particles of the present invention can be colored by a general coloring method. The coloring method is not particularly limited, and a method of dying the cellulose fine particles with a conventionally known dye such as direct dye, reactive dye, vat dye and sulfur dye may be used. The cellulose fine particles may also be colored by incorporating a pigment into the fine particles. Depending on the coloring conditions, the same characteristics as those of the uncolored cellulose fine particles may be maintained, or the fine particles may be adjusted to have different characteristics.

The colored cellulose fine particles of the present invention can be applied to uses where a multi-material colored fine particles are used, in addition to uses of the uncolored cellulose fine particles. Examples of the application include use for forming a molding with high coloration uniformity in the formation of a cellulose fine particle solid dispersion, use for elevating the visibility or detactability and increasing the sensitivity in use as a carrier for immunodiagnostic reagents, and various image forming materials.

In the present invention, the kind of the cellulose is not particularly limited, and cellulose such as regenerated cellulose, purified cellulose and natural cellulose may be used as long as it satisfies the average particle diameter and the average polymerization degree. However, from the standpoint that the particle diameter, polymerization degree, CV value, sphericity, aggregation constant and the like are easily adjusted, regenerated cellulose or purified cellulose is preferred, and regenerated cellulose is more preferred. Also, a part of the hydroxyl groups of cellulose may be derivatized.

The formation method of the fine particle is also not particularly limited. However, a method of dissolving cellulose in a good solvent for cellulose and adding the resulting cellulose solution in a bad solvent for cellulose, thereby coagulating the cellulose, is preferred, because the particle diameter, polymerization degree, CV value, sphericity, aggregation constant and the like can be easily adjusted. According to this method, the average polymerization degree of the cellulose constituting the fine particles can be adjusted by selecting the average polymerization degree of the cellulose raw material. Also, the particles diameter of the obtained cellulose fine particles can be adjusted by selecting the composition of the bad solvent. Furthermore, the shape of the obtained fine particle can be easily controlled, and the components such as surfactant are hardly allowed to remain.

The average polymerization degree of the cellulose raw material is preferably from 160 to 3,500 and slightly higher than the desired average polymerization degree of the cellulose fine particles. The solvent which dissolves the cellulose is also not particularly limited, but a cuprammonium solution is preferred. The ammonia concentration of the cuprammonium solution in which the cellulose is dissolved is not particularly limited as long as it is a concentration high enough to dissolve the cellulose. The ammonia concentration is preferably 30% or more of the cellulose concentration and a concentration of 20 wt % or less, more preferably 60% or more of the cellulose concentration and a concentration of 10 wt % or less.

The bad solvent for cellulose, used as a coagulating solution, includes the liquids described above as examples of the dispersion medium and is preferably a water-soluble organic solvent, a mixture of water-soluble organic solvent and water, or a mixture of water-soluble organic solvent, water and ammonia. The water-soluble organic solvent is preferably a ketone, an alcohol, an ether or an organic sulfur compound.

In order to obtain a uniform fine particle having a small particle diameter, which is purposed in the present invention, selection of the coagulating solution composition is important. The coagulation rate is adjusted by adjusting the coagulating solution composition, as a result, the particle growth rate is controlled. If the coagulation rate is low, particle growth occurs and the average particle diameter becomes large. The average particle diameter becomes large also when the coagulation rate is conversely too high. For example, in the case of using acetone as the bad solvent, although depending on the cellulose solution composition added and the coagulation temperature, the acetone is preferably used as an aqueous solution of 20 to 45 wt %. The optimal composition varies depending on the kind of the bad solvent.

The formation method of the cellulose fine particles employed in the present invention is described below by referring to a more detailed and specific example, but the cellulose fine particles of the present invention are not limited by this specific example.

First, cellulose linters are dissolved in a good solvent for cellulose. In the present invention, a cuprammonium solution prepared by a method known in this art may be used as the good solvent. As regards the coagulating solution, for example, a solution of the above-described organic solvent alone, a solution prepared by mixing different kinds of organic solvents at an arbitrary ratio, or a solution prepared by mixing an organic solvent and water is mainly used. While stirring the coagulating solution, the cuprammonium cellulose solution prepared above is added, thereby effecting coagulation. Furthermore, neutralization and regeneration are performed by adding a sulfuric acid, whereby a slurry containing the objective cellulose fine particle can be obtained. The slurry here is acidic due to remaining acid used for regeneration and contains impurities such as ammonium salt generated resulting from neutralization. For removing these acid and impurities, an operation of purifying the slurry into a cellulose liquid dispersion comprising the cellulose fine particle and the dispersion medium may be performed. In the present invention, as this purification operation, the operations of centrifugal separation, decantation and dilution with a dispersion medium are repeated in this order. The kind of the dispersion medium used here is also not particularly limited, and various solvents described above can be used according to the purpose.

The cellulose fine particles in the obtained cellulose fine particle liquid dispersion may cause aggregation in the process of coagulation operation or purification operation and in such a case, various dispersing treatments can be applied. The dispersing treatment is not limited in its kind, and examples thereof include a treatment in a ball mill, a treatment with an ultrasonic wave, and a treatment in a high-pressure homogenizer. However, in view of treatment efficiency or less mixing of foreign matters, a treatment in a high-pressure homogenizer is preferred. The thus-obtained cellulose fine particle liquid dispersion is measured for average particle diameter and CV value. Furthermore, the cellulose fine particle liquid dispersion is dried, whereby powdery cellulose fine particles can be produced. In the present invention, freeze-drying under reduced pressure can be used as the drying method. The obtained powdery cellulose fine particles are observed through an electron microscope, and the sphericity and aggregation constant are measured from the image thereon. Furthermore, the powdery cellulose fine particles are dissolved in a cadoxen solution, and the average polymerization degree is measured from the viscosity of the solution.

EXAMPLES

First of all, the measuring methods of the cellulose fine particles of the present invention and a liquid dispersion and a solid dispersion thereof are described in detail below. Unless otherwise indicated, all operations were performed in an environment of 25° C.

(1) Particle Size Distribution (Average Particle Diameter and CV Value):

The cellulose fine particle liquid dispersion was measured using a Nanotrac particle size distribution measuring apparatus UFA-EX150 manufactured by Nikkiso Co., Ltd. The measurement was performed three times in total, and the average value thereof is used as the measured value. Unless otherwise indicated, pure water was used as the liquid in which the cellulose fine particles were dispersed, and the cellulose fine particle concentration at the measurement was about 0.1 wt %. As for the physical values of water required in the measurement, those of ordinary water were used.

(2) Observation by Electron Microscope

The cellulose fine particles were observed using the following three kinds of electron microscopes according to the necessary magnification. That is, a transmission electron microscope JEM2000EX manufactured by JEOL Ltd. (observed at an accelerating voltage of 100 kV and a magnification of 50,000 or 100,000), a scanning electron microscope JSM-6700 manufactured by JEOL Ltd. (observed at an accelerating voltage of 1.6 kV and a magnification of 100,000), and a scanning electron microscope JSM-6380 manufactured by JEOL Ltd. (observed at an accelerating voltage of 10 kV and a magnification of 5,000) were used. As for the drying from a cellulose fine particle liquid dispersion to powdery cellulose fine particles, unless otherwise indicated, freeze-drying under reduced pressure was performed by rapidly freezing the cellulose fine particle liquid dispersion with liquid nitrogen and reducing the pressure.

(3) Calculation of Volumetric Median Diameter and Sphericity from Electron Micrographic Image The image photographed using an electron microscope was analyzed by an image analyzing software for particle size distribution measurement, Mac-View, Ver. 3, produced by Mountech Co., Ltd.

(4) Dispersing Treatment of Cellulose Fine Particle Liquid Dispersion:

Unless otherwise indicated, a hydraulic ultrahigh-pressure homogenizer M-110-E/H manufactured by Microfluidics was used. The treatment pressure was 50 MPa, and an operation of passing the liquid dispersion through a chamber as the high-pressure part 10 times was performed.

The present invention is described in greater detail below by referring to Examples and Comparative Examples, but the present invention is not limited only to these Examples.

Example 1

Cellulose linters (average polymerization degree: 679) were dissolved in a cuprammonium solution, and the resulting solution was further diluted with water and ammonia to prepare a cuprammonium cellulose solution having a cellulose concentration of 0.37 wt %. In the solution, the copper concentration was 0.13 wt %, and the ammonia concentration was 1.00 wt %.

Also, a coagulating solution having an acetone concentration of 26.5 wt %, an ammonia concentration of 0.20 wt % and a water concentration of 73.3 wt % was prepared. While slowly stirring 5,000 g of the coagulating solution with a magnetic stirrer, 500 g of the cuprammonium cellulose solution having a cellulose concentration of 0.37 wt % prepared above was added. After continuing the stirring for about 5 seconds, neutralization and regeneration were performed by adding 1,000 g of 10 wt % sulfuric acid to obtain 6,500 g of a slurry containing the objective cellulose fine particles.

The obtained slurry was centrifuged at a speed of 10,000 rpm for 10 minutes. The precipitate was taken out by decantation, deionized water was poured and after stirring, the slurry was again centrifuged. This operation was repeated several times until the pH became 7.0. Thereafter, a dispersing treatment in a high-pressure homogenizer was performed to obtain 150 g of a cellulose fine particle liquid dispersion. Also, this cellulose fine particle liquid dispersion was freeze-dried under reduced pressure to obtain powdery cellulose fine particles. All operations were performed in an environment of 25° C.

FIG. 1 shows the electron micrographic image of the obtained powdery cellulose fine particles. The electron microscope used was a transmission electron microscope JEM2000EX manufactured by JEOL Ltd., and the fine particles were observed at a magnification of 50,000. Furthermore, the average particle diameter, average polymerization degree, CV value, sphericity and aggregation constant of the obtained cellulose fine particles were measured. The results are shown in Table 1.

Example 2

Cellulose linters (average polymerization degree: 679) were dissolved in a cuprammonium solution, and the resulting solution was further diluted with water and ammonia to prepare a cuprammonium cellulose solution having a cellulose concentration of 0.37 wt %. In the solution, the copper concentration was 0.13 wt %, and the ammonia concentration was 3.00 wt %.

Also, a coagulating solution having a dimethylsulfoxide concentration of 52.0 wt % and a water concentration of 48.0 wt % was prepared. This coagulating solution was produced by diluting dimethylsulfoxide (special grade, produced by Wako Pure Chemical Industries, Ltd.) with pure water. While slowly stirring 5,000 g of the coagulating solution with a magnetic stirrer at a speed of 400 rpm, 500 g of the cuprammonium cellulose solution having a cellulose concentration of 0.37 wt % prepared above was added. After continuing the stirring for about 5 seconds, neutralization and regeneration were performed by adding 1,000 g of 10 wt % sulfuric acid to obtain 6,500 g of a slurry containing the objective cellulose fine particles.

The obtained slurry was centrifuged at a speed of 10,000 rpm for 10 minutes. The precipitate was taken out by decantation, pure water was poured and after stirring, the slurry was again centrifuged. This operation was repeated several times until the pH became from 7.0 to 6.5. Thereafter, a dispersing treatment in a high-pressure homogenizer was performed to obtain 150 g of a cellulose fine particle liquid dispersion. Also, this cellulose fine particle liquid dispersion was freeze-dried under reduced pressure to obtain powdery cellulose fine particles. All operations without description of the temperature were performed in an environment of 25° C. The average particle diameter, average polymerization degree, CV value, sphericity and aggregation constant of the obtained cellulose fine particles were measured, and the results are shown in Table 1.

Example 3

A cellulose fine particle liquid dispersion and powdery cellulose fine particles were obtained thoroughly in the same manner as in Example 1 except that the coagulating solution used for coagulation had a tetrahydrofuran concentration of 90 wt % and a water concentration of 10 wt %. The coagulating solution was produced by diluting tetrahydrofuran (special grade, produced by Wako Pure Chemical Industries, Ltd.) with pure water. The average particle diameter, average polymerization degree, CV value, sphericity and aggregation constant of the obtained cellulose fine particles were measured, and the results are shown in Table 1.

Example 4

Figure 4:
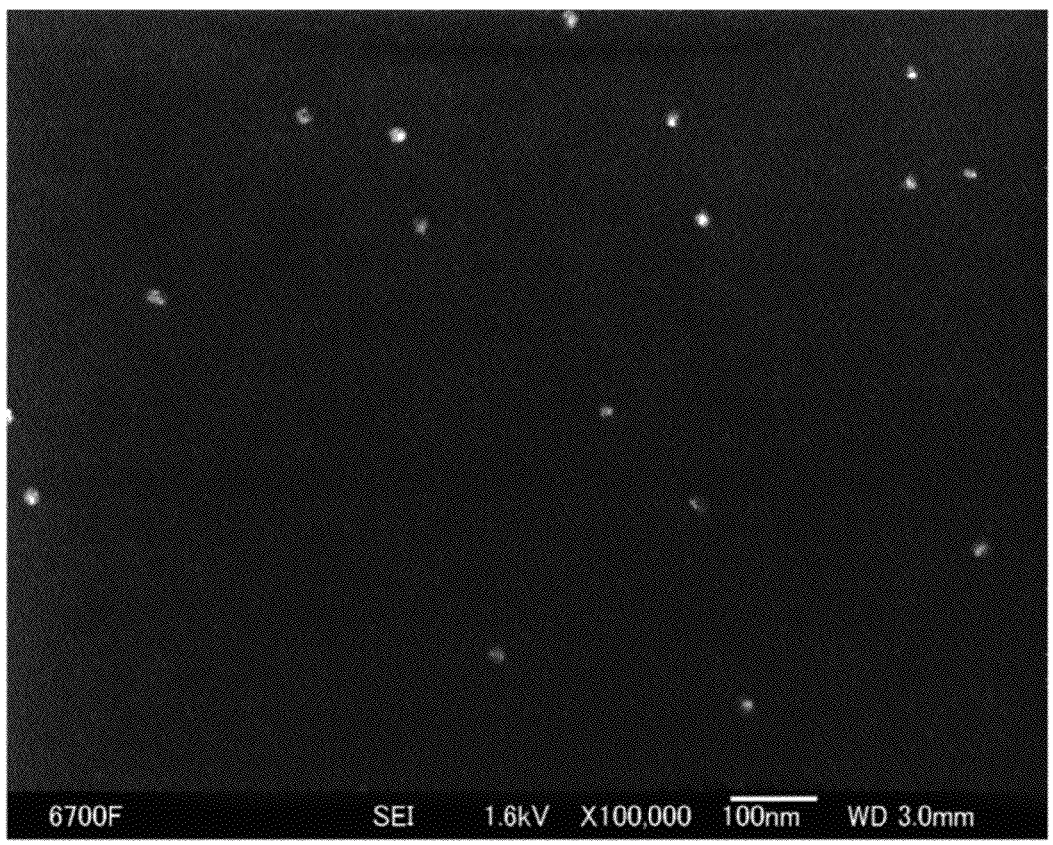
FIG. 4 is an electron micrograph of the cellulose fine particles obtained in Example 4, where the scale bar is 100 nm.

A cellulose fine particle liquid dispersion and powdery cellulose fine particles were obtained thoroughly in the same manner as in Example 2 except that the cuprammonium cellulose solution had an ammonia concentration of 6.3 wt % and the coagulating solution used for coagulation was isopropanol. As for the coagulating solution, isopropanol (special grade, produced by Kishida Chemical Co., Ltd.) was directly used without diluting it. FIG. 4 shows the electron micrographic image of the obtained powdery cellulose fine particles. The electron microscope used was a scanning electron microscope JSM-6700 manufactured by JEOL Ltd., and the fine particles were observed at a magnification of 100,000. The average particle diameter, average polymerization degree, CV value, sphericity and aggregation constant of the obtained cellulose fine particles were measured, and the results are shown in Table 1.

Comparative Example 1

A cellulose fine particle liquid dispersion and powdery cellulose fine particles were obtained thoroughly in the same manner as in Example 1 except that the coagulating solution used for coagulation had a tetrahydrofuran concentration of 95 wt % and a water concentration of 5 wt %. The average particle diameter, average polymerization degree, CV value, sphericity and aggregation constant of the obtained cellulose fine particles were measured, and the results are shown in Table 1.

Comparative Example 2

Figure 2:
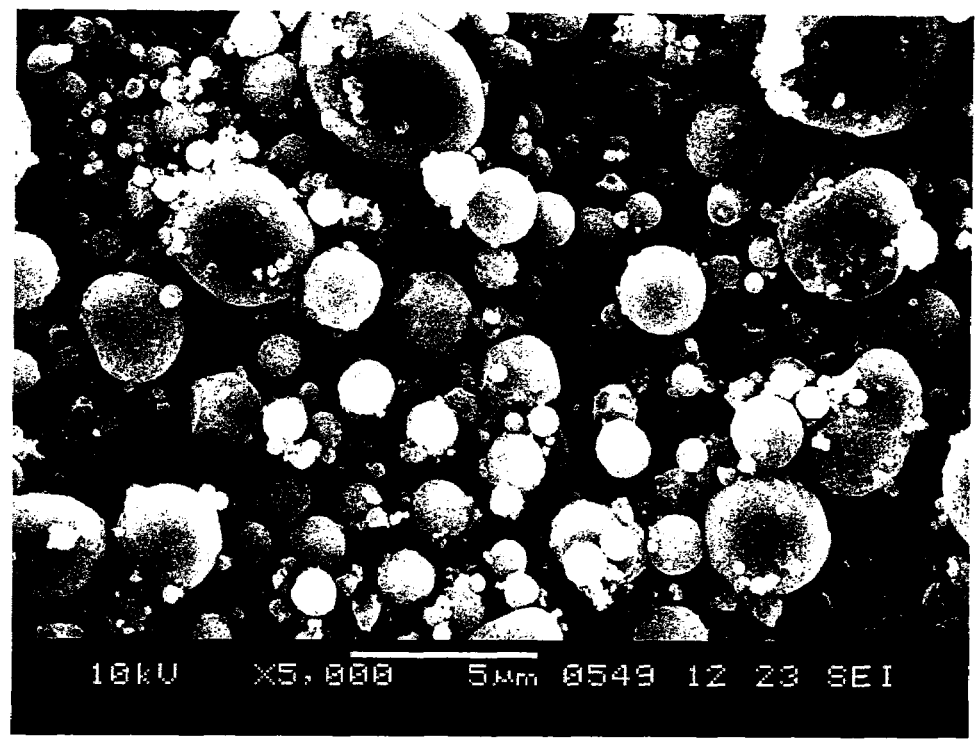
FIG. 2 is an electron micrograph of the cellulose fine particles obtained in Comparative Example 2, where the scale bar is 5,000 nm.

A cellulose fine particle liquid dispersion and powdery cellulose fine particles were obtained thoroughly in the same manner as in Example 1 except that the coagulating solution used for coagulation had a tetrahydrofuran concentration of 99 wt % and a water concentration of 1 wt %. FIG. 2 shows the electron micrographic image of the obtained powdery cellulose fine particles. The electron microscope used was a scanning electron microscope JSM-6380 manufactured by JEOL Ltd., and the fine particles were observed at a magnification of 5,000. Furthermore, the average particle diameter, average polymerization degree, CV value, sphericity and aggregation constant of the obtained cellulose fine particles were measured, and the results are shown in Table 1.

TABLE 1

|  | Average Particle Diameter | Average Polymerization Degree | CV Value | Sphericity | Aggregation Constant | Particle Shape |
|---|---|---|---|---|---|---|
| Example 1 | 44 nm | 592 | 19% | 0.92 | 1.09 | spherical |
| Example 2 | 41 nm | 595 | 18% | 0.93 | 1.07 | spherical |
| Example 3 | 248 nm | 579 | 22% | 0.90 | 1.08 | spherical |
| Example 4 | 9.6 nm | 586 | 19% | 0.90 | 1.08 | spherical |
| Comparative Example 1 | 484 nm | 601 | 25% | 0.89 | 1.21 | spherical |
| Comparative Example 2 | 3031 nm | 589 | 45% | 0.72 | 2.65 | spherical |

As apparent from Table 1, in the cellulose fine particles of the present invention, the average particle diameter is not proportional to the average polymerization degree. Also, it is seen that in the present invention, various water-soluble organic solvents are used and an optimal composition for each organic solvent is adjusted, whereby the particle growth rate is controlled and uniform cellulose fine particles with a small particle diameter were obtained.

The average particle diameter of each of the cellulose fine particles obtained above in Examples and Comparative Examples, and the particle size distribution range determined using a particle size distribution measuring apparatus are shown in Table 2. Furthermore, 100 ml of each cellulose fine particle liquid dispersion is charged into a glass vessel (Labora Screw Tube Vial, 110 ml, produced by AS ONE Corp.) and after standing still for 1 month, the presence or absence of precipitation of the cellulose fine particles was confirmed to examine the dispersion stability. The rating was performed on a four-step scale, that is, "IV" when precipitation was not confirmed at all, "B" when precipitation was very slightly confirmed in the bottom-most part of the liquid dispersion, "C" when precipitation was confirmed in the bottom-most part of the liquid dispersion and turbidity in the top-most part of the liquid dispersion was thinned, and "D" when all particles were precipitated. The results are also shown in Table 2. As apparent from Table 2, in the cellulose fine particle liquid distribution where the maximum value of the particle size distribution does not exceed 1,000 nm, precipitation was not confirmed at all even after standing still for 1 month. This reveals that in addition to the hydrophilicity possessed by the cellulose, by virtue of the maximum particle diameter being 1,000 nm or less, the cellulose fine particle liquid dispersion of the present invention has very high dispersion stability.

Also, the cellulose fine particle liquid dispersion after standing still for 1 month was stirred (in Comparative Examples 1 and 2, precipitated cellulose fine particles were again dispersed in water), and the average particle diameter after a lapse of 1 month was measured. The results thereof are shown together in Table 2. It was verified from these results that all cellulose fine particle liquid dispersions did not cause aggregation despite not containing a stabilizer such as surfactant and are excellent in the stability.

TABLE 2

|  | Average Particle Diameter | Distribution Range | Precipitation After 1 Month | Average Particle Diameter After 1 Month |
|---|---|---|---|---|
| Example 1 | 44 nm | 36 to 86 nm | A | 43 nm |
| Example 2 | 41 nm | 30 to 86 nm | A | 43 nm |

TABLE 2-continued

| | Average Particle Diameter | Distribution Range | Precipitation After 1 Month | Average Particle Diameter After 1 Month |
|---|---|---|---|---|
| Example 3 | 248 nm | 145 to 486 | A | 249 nm |
| Example 4 | 9.6 nm | 7.6 to 18 nm | A | 9.9 nm |
| Comparative Example 1 | 484 nm | 243 to 1375 nm | C | 498 nm |
| Comparative Example 2 | 3031 nm | 687 to 6540 nm | D | 2970 nm |

Example 5

A cellulose fine particle liquid dispersion and powdery cellulose fine particles were obtained thoroughly in the same manner as in Example 1 except that the average polymerization degree of cellulose linters dissolved was 1,481. The average particle diameter, average polymerization degree, CV value, sphericity and aggregation constant of the obtained cellulose fine particles were measured, and the results are shown in Table 3.

Example 6

A cellulose fine particle liquid dispersion and powdery cellulose fine particles were obtained thoroughly in the same manner as in Example 1 except that the average polymerization degree of cellulose linters dissolved was 2,531. The average particle diameter, average polymerization degree, CV value, sphericity and aggregation constant of the obtained cellulose fine particles were measured, and the results are shown in Table 3.

Example 7

A cellulose fine particle liquid dispersion and powdery cellulose fine particles were obtained thoroughly in the same manner as in Example 1 except that the average polymerization degree of cellulose linters dissolved was decreased to 370 by performing acid hydrolysis according to a method known in this art. The average particle diameter, average polymerization degree, CV value, sphericity and aggregation constant of the obtained cellulose fine particles were measured, and the results are shown in Table 3.

Example 8

A cellulose fine particle liquid dispersion and powdery cellulose fine particles were obtained thoroughly in the same manner as in Example 1 except that the average polymerization degree of cellulose linters dissolved was decreased to 200 by performing acid hydrolysis according to a method known in this art. The average particle diameter, average polymerization degree, CV value, sphericity and aggregation constant of the obtained cellulose fine particles were measured, and the results are shown in Table 3.

Comparative Example 3

A cellulose fine particle liquid dispersion and powdery cellulose fine particles were obtained thoroughly in the same manner as in Example 1 except that a regenerated cellulose non-woven fabric obtained from a cuprammonium cellulose solution prepared by a method known in this art, of which average polymerization degree was decreased to 148 by performing acid hydrolysis according to a method known in this art, was used as the cellulose dissolved. The average particle diameter, average polymerization degree, CV value, sphericity and aggregation constant of the obtained cellulose fine particles were measured, and the results are shown in Table 3.

TABLE 3

| | Average Particle Diameter | Average Polymerization Degree | CV Value | Sphericity | Aggregation Constant | Particle Shape |
|---|---|---|---|---|---|---|
| Example 5 | 43 nm | 1340 | 21% | 0.90 | 1.10 | spherical |
| Example 6 | 46 nm | 2349 | 17% | 0.92 | 1.11 | spherical |
| Example 7 | 42 nm | 310 | 19% | 0.87 | 1.08 | spherical |
| Example 8 | 43 nm | 178 | 20% | 0.86 | 1.11 | spherical |
| Comparative Example 3 | 40 nm | 125 | 20% | 0.90 | 1.09 | spherical |

As apparent from Table 3, in the cellulose fine particles of the present invention, the average particle diameter is not changed even when the average polymerization degree is decreased.

Example 9

Figure 3:
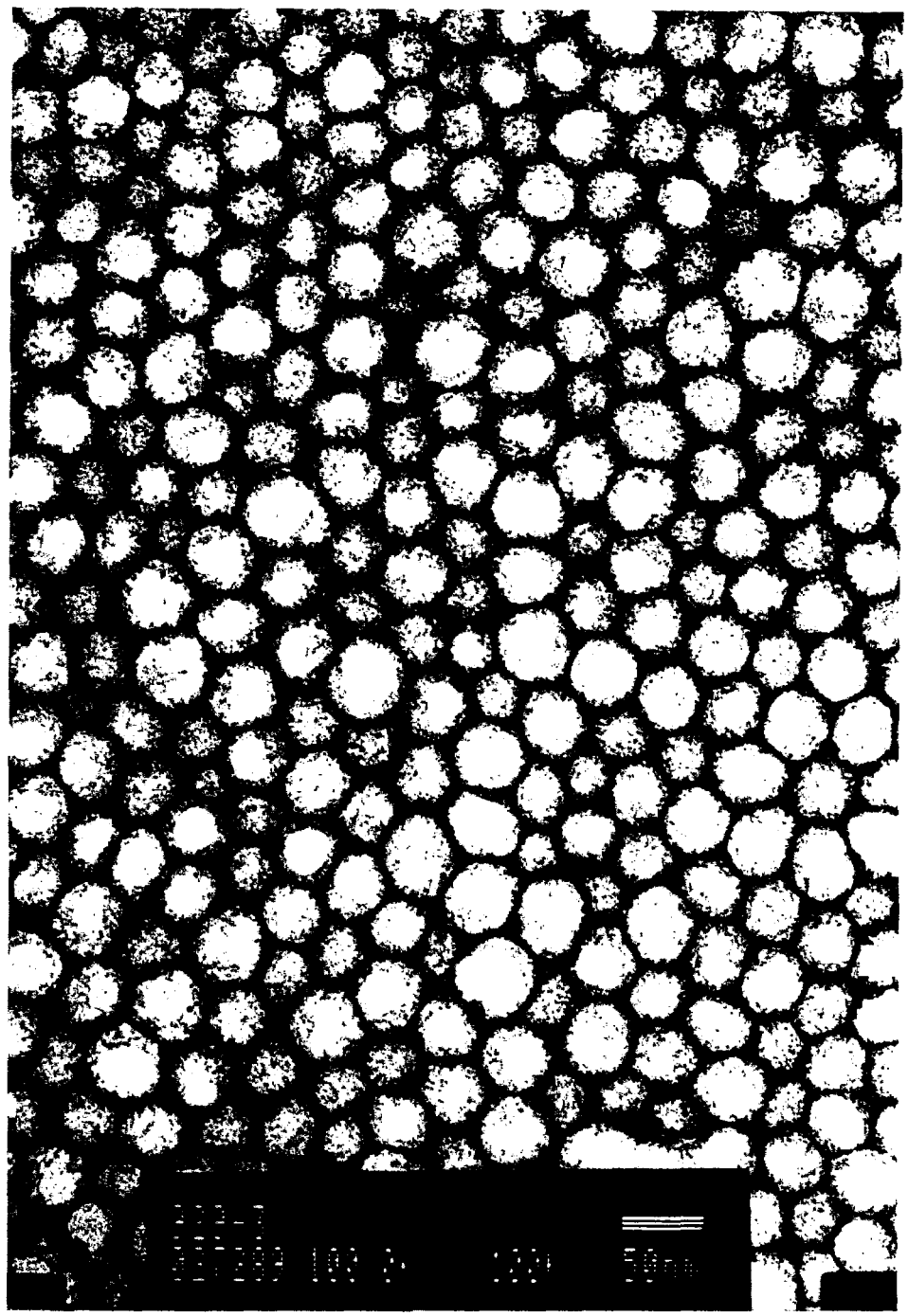
FIG. 3 is an electron micrograph of the cellulose fine particles obtained in Example 9, where the scale bar is 50 nm.

A cellulose fine particle liquid dispersion was prepared thoroughly in the same manner as in Example 1 and further filtered under reduced pressure by using a polycarbonate filter "Isopore" having a pore size of 50 nm produced by Millipore Corp. Using the cellulose fine particle liquid dispersion after filtration, powdery cellulose fine particles were obtained by freeze-drying under reduced pressure in the same manner as in Example 1. FIG. 3 shows the electron micrographic image of the obtained powdery cellulose fine particles. The electron microscope used was a transmission electron microscope JEM2000EX manufactured by JEOL Ltd., and the fine particles were observed at a magnification of 100,000. The average particle diameter of the cellulose fine particles after filtration was 39 nm, the average polymerization degree was 588, the CV value was 13%, the sphericity was 0.92, and the aggregation constant was 1.07. The CV value of the cellulose fine particles after filtration is smaller than that before filtration and as apparent also from comparison between FIG. 1 and FIG. 3, cellulose fine particles with higher particle uniformity can be obtained by classifying the particles.

Example 10

Using the cellulose fine particle liquid dispersion obtained in Example 3, the operations of centrifugal separation, decantation and dilution with acetone were repeated in this order three times to prepare a cellulose fine particle liquid dispersion in acetone, where the medium for dispersing the cellulose fine particles therein was replaced by acetone. At this time, the operation of centrifugal separation was performed at a speed of 10,000 rpm for 20 minutes. The obtained cellulose fine particle liquid dispersion was subjected to measurements of the average particle diameter, CV value, sphericity and aggregation constant of the cellulose fine particles in the same manner as in Example 1. The results thereof are shown in Table 4. Furthermore, the dispersion stability after standing still for 1 month was confirmed in the same manner as in Examples 1 to 4, but precipitation was not generated. The results thereof are shown in Table 5.

Example 11

A cellulose fine particle liquid dispersion in isopropyl alcohol was prepared thoroughly in the same manner as in Example 10 except that the solvent used for dilution after decantation was changed to isopropyl alcohol (IPA). The obtained cellulose fine particle liquid dispersion was subjected to measurements of the average particle diameter, CV value, sphericity and aggregation constant of the cellulose fine particles in the same manner as in Example 1. The results thereof are shown in Table 4. Furthermore, the dispersion stability after standing still for 1 month was confirmed in the same manner as in Examples 1 to 4, but precipitation was not generated. The results thereof are shown in Table 5.

TABLE 4

| | Replacing Medium | Average Particle Diameter | CV Value | Sphericity | Aggregation Constant | Particle Shape |
| --- | --- | --- | --- | --- | --- | --- |
| Example 3 | water | 248 nm | 22% | 0.90 | 1.08 | spherical |
| Example 10 | acetone | 251 nm | 18% | 0.92 | 1.09 | spherical |
| Example 11 | IPA | 247 nm | 19% | 0.89 | 1.10 | spherical |

TABLE 5

| | Replacing Medium | Average Particle Diameter | Distribution Range | Precipitation After 1 Month | Average Particle Diameter After 1 Month |
| --- | --- | --- | --- | --- | --- |
| Example 3 | water | 248 nm | 145 to 486 nm | A | 249 nm |
| Example 10 | acetone | 251 nm | 145 to 486 nm | A | 253 nm |
| Example 11 | IPA | 247 nm | 145 to 486 nm | A | 251 nm |

As apparent from Table 4, the cellulose fine particles obtained in the present invention can be stably dispersed not only in water but also in an organic solvent without causing changes in the size and shape. Also, as apparent from Table 5, the cellulose fine particle liquid dispersion obtained in the present invention is excellent in the dispersion stability without causing aggregation or precipitation not only in water, but also in an organic solvent.

Example 12

Using the cellulose fine particle liquid dispersion obtained in Example 2, the operations of centrifugal separation, decantation and dilution with tert-butyl alcohol were repeated three times to prepare a cellulose fine particle liquid dispersion in tert-butyl alcohol, where the medium for dispersing the cellulose fine particles therein was replaced by tert-butyl alcohol. At this time, the operation of centrifugal separation was performed at a speed of 50,000 rpm for 60 minutes. Also, the liquid dispersion was adjusted such that the fine particle concentration in the final liquid dispersion becomes 0.1 wt %. Subsequently, 100 g of the obtained cellulose fine particle liquid dispersion in tert-butyl alcohol was rapidly frozen with liquid nitrogen and freeze-dried under reduced pressure by reducing the pressure to obtain powdery cellulose fine particles. Furthermore, 100 g of pure water was prepared as a liquid in which the obtained powdery cellulose fine particles are resuspended, 0.1 g of the powdery cellulose fine particles were added thereto, and the mixture was subjected to a dispersion treatment using an ultrasonic disperser (UH150, manufactured by SMT). The average particle diameter of the resulting resuspended cellulose fine particle liquid dispersion was measure by a particle size distribution measuring apparatus. The results thereof are shown in Table 6.

TABLE 6

| | Dispersion Medium | Average Particle Diameter | Distribution Range |
| --- | --- | --- | --- |
| Example 2 | water | 41 nm | 30 to 86 nm |
| Example 12 | water | 43 nm | 26 to 86 nm |

As apparent from Table 6, there is almost no difference between the average particle diameter after resuspending the powdery cellulose fine particles obtained in the present invention in a liquid and the average particle diameter before drying.

Example 13

A cellulose fine particle liquid dispersion was prepared thoroughly in the same manner as in Example 2 except for adjusting the liquid dispersion such that the fine particle concentration in the final liquid dispersion becomes 5.0 wt %. The obtained cellulose fine particle liquid dispersion was heated in a water bath and warmed to 60° C. and while slowly stirring with a magnetic stirrer, a reactive dye (Remazol Black BHI-GRAN. 150) previously dissolved in pure water was added to give a dye concentration of 20% omf based on the total weight of the cellulose fine particles. After dyeing for 30 minutes, centrifugal separation and decantation were performed, and the operations of adding hot water at 80° C. and performing centrifugal separation and decantation were repeated three times in total, thereby effecting soaking of the cellulose fine particles. The obtained cellulose fine particle liquid dispersion was subjected to a dispersion treatment using an ultrasonic disperser (UH150, manufactured by SMT) to obtain a cellulose fine particle liquid dispersion colored navy blue.

Example 14

In 10 g of an aqueous acrylic paint "Aqueous Hobby Color" (produced by GCI Creos Corp., Part No. H30, clear), 1 g of the cellulose fine particle liquid dispersion obtained in Example 1 (fine particle concentration: 1.0 wt %) was added and well mixed. Thereafter, the paint was coated on an acrylic plate to have a coating thickness of 50 to 70 μm and left standing to dry in an environment of 25° C. for 24 hours. When the coated cross-section was observed through an electron microscope, uniformly dispersed cellulose fine particles were observed. Also, the above-described paint alone was coated on an acrylic plate and dried in the same manner, and the coated surface was compared with a naked eye, as a result, there was not a great difference between two samples and the coated state was good.

Example 15

A colored cellulose fine particle-containing film coating was formed on an acrylic plate thoroughly in the same manner as in Example 14, except that the cellulose fine particle liquid dispersion used was the colored cellulose fine particle liquid dispersion obtained in Example 13. The obtained film coating was blue and the coloring effect by the fine particles could be confirmed. Also, in the coated cross-section, colored cellulose fine particles were uniformly dispersed similarly to Example 14.

As apparent from these results, the cellulose fine particles obtained in the present invention are unprecedented cellulose fine particles favored with all of small average particle diameter, high average polymerization degree, uniform particle diameter, high sphericity, less aggregation and the like, and these cellulose fine particles are therefore excellent in dispersion stability and strong in mechanical strength, can be stably present in a liquid such as water or an organic solvent, and furthermore can also be uniformly dispersed in a solid. In addition, there cellulose fine particles are revealed to have various characteristics such that the powdery fine particles can be suspended in a liquid without causing aggregation of particles with each other and the particles can be colored.

Industrial Applicability

The cellulose fine particles of the present invention can be applied to uses where monodisperse fine particles of polystyrene or the like have been used, in addition to conventional uses of the cellulose fine particles. Specific examples of the application include a slipperiness-imparting agent, a toner, a delustering agent for paints, an additive for light diffusion, an antiblocking material for packaging mediums, an insulating filler, a crystal nucleating agent, a filler for chromatography, an abrasive, a packing material for various fractionation columns, an enzyme support, a microorganism culture carrier, a cell culture carrier, a filter medium, an adsorbent, a medicament excipient, a medicament disintegrant, a medicament extender, a particle enlargement substrate, a food thickener, a thixotropy-imparting agent, a dispersion stabilizer, a plastic extender, a filler, a cosmetic foundation base, an exterior paint modifier, a coating agent, a molding agent for catalyst production by firing method, a fiber wall material, a compounding ingredient for pressure-sensitive copying paper, a carrier for immunodiagnostic reagents, a carrier for genetic diagnostics, a spacer for liquid crystal displays, various image forming materials, a standard particle for calibration of electronic measuring instruments, a standard particle for test of filters, and a substrate particle of the electrically conductive particle for circuit connection.

The invention claimed is:

1. Spherical cellulose fine particles having a volume average particle diameter of 9 to 400 nm and an average polymerization degree (DP) of cellulose of 150 to 3,000.

2. The spherical cellulose fine particles according to claim 1, wherein the CV value represented by the following formula is from 10 to 70%:

CV Value =(standard deviation in the volumetric particle size distribution determined by a particle size distribution measuring apparatus)/(volumetric median diameter determined by the particle size distribution measuring apparatus).

3. The spherical cellulose fine particles according to claim 1, wherein the sphericity is from 0.70 to 1.00.

4. The spherical cellulose fine particles according to claim 1, wherein the aggregation constant represented by the following formula is from 1.00 to 2.50:

Aggregation constant =(volume average median diameter determined by a particle size distribution measuring apparatus)/(volumetric median diameter determined from electron micrographic image).

5. The spherical cellulose fine particles according to claim 1, which is colored with a dye or pigment.

6. A spherical cellulose fine particle liquid dispersion obtained by dispersing the cellulose fine particles according to claim 1 in a liquid.

7. Powdery spherical cellulose fine particles obtained by drying the spherical cellulose fine particle liquid dispersion according to claim 6.

8. A spherical cellulose fine particle liquid dispersion obtained by resuspending the powdery spherical cellulose fine particles according to claim 7 in a liquid.

9. A spherical cellulose fine particle solid dispersion obtained by dispersing the cellulose fine particles according to claim 1 in a solid.

10. A spherical cellulose fine particle solid dispersion obtained by dispersing the powdery cellulose fine particles according to claim 7 in a solid.

* * * * *